(12) United States Patent
Takahashi et al.

(10) Patent No.: US 11,600,241 B2
(45) Date of Patent: Mar. 7, 2023

(54) DISPLAY CONTROL DEVICE, IMAGING DEVICE, DISPLAY CONTROL METHOD, AND DISPLAY CONTROL PROGRAM

(71) Applicant: FUJIFILM Corporation, Tokyo (JP)

(72) Inventors: Kosuke Takahashi, Saitama (JP); Takehiro Koguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/391,859

(22) Filed: Aug. 2, 2021

(65) Prior Publication Data

US 2021/0366423 A1 Nov. 25, 2021

Related U.S. Application Data

(63) Continuation of application No. PCT/JP2020/005626, filed on Feb. 13, 2020.

(30) Foreign Application Priority Data

Feb. 20, 2019 (JP) ............................. JP2019-028619

(51) Int. Cl.
*G09G 3/36* (2006.01)
*G09G 3/3225* (2016.01)

(52) U.S. Cl.
CPC ......... *G09G 3/3648* (2013.01); *G09G 3/3225* (2013.01)

(58) Field of Classification Search
CPC ............... G09G 3/3648; G09G 3/3225; G09G 2320/0247; G09G 2320/103;
(Continued)

(56) References Cited

U.S. PATENT DOCUMENTS 9,716,834 B2 * 7/2017 Kato ....................... G06T 7/223
2004/0246242 A1 * 12/2004 Sasaki .................... G09G 3/342
345/204
(Continued)

FOREIGN PATENT DOCUMENTS

JP 2006-189661 A 7/2006
JP 2014-032412 A 2/2014
(Continued)

OTHER PUBLICATIONS

International Search Report issued in PCT/JP2020/005626; dated Apr. 21, 2020.
(Continued)

*Primary Examiner* — Sahlu Okebato
(74) *Attorney, Agent, or Firm* — Studebaker & Brackett PC

(57) ABSTRACT

A display control device performs a display control of motion picture data, and includes a specific image insertion control unit that performs an insertion control of displaying a specific image different from the motion picture data on a display unit in a period from displaying a first frame of the motion picture data on the display unit to displaying a second frame subsequent to the first frame of the motion picture data; and an insertion execution control unit that decides whether or not to execute the insertion control based on a moving amount of a moving object included in the motion picture data and an observation angle of one pixel of the motion picture data displayed on the display unit.

26 Claims, 9 Drawing Sheets

(58) Field of Classification Search
CPC .. G09G 2320/106; G09G 5/026; G09G 5/001; H04N 5/232
See application file for complete search history.

(56) References Cited

U.S. PATENT DOCUMENTS

| | | |
|---|---|---|
| 2006/0146005 A1 | 7/2006 | Baba et al. |
| 2008/0238854 A1 | 10/2008 | Kimura |
| 2009/0184916 A1 | 7/2009 | Miyazaki et al. |
| 2010/0002133 A1* | 1/2010 | Ueno ............... H04N 7/014 |
| | | 348/E7.003 |
| 2010/0013991 A1 | 1/2010 | Miyazaki et al. |
| 2010/0034272 A1 | 2/2010 | Miyazaki et al. |
| 2017/0053610 A1 | 2/2017 | Yang et al. |

FOREIGN PATENT DOCUMENTS

| | | | |
|---|---|---|---|
| JP | 2014-035525 A | 2/2014 | |
| WO | 03/032288 A1 | 4/2003 | |
| WO | 2008/102828 A1 | 8/2008 | |
| WO | WO-2013089193 A1 * | 6/2013 | ............... G01T 1/16 |

OTHER PUBLICATIONS

International Preliminary Report on Patentability (Chapter II) issued in PCT/JP2020/005626 Date of completion of this report: Dec. 4, 2020.

An Office Action; "Notice of Reasons for Refusal", mailed by the Japanese Patent Office dated May 10, 2022, which corresponds to Japanese Patent Application No. 2021-501922 and is related to U.S. Appl. No. 17/391,859; with English language translation.

* cited by examiner

DISPLAY CONTROL DEVICE, IMAGING DEVICE, DISPLAY CONTROL METHOD, AND DISPLAY CONTROL PROGRAM

CROSS REFERENCE TO RELATED APPLICATION

This is a continuation of International Application No. PCT/JP2020/005626 filed on Feb. 13, 2020, and claims priority from Japanese Patent Application No. 2019-028619 filed on Feb. 20, 2019, the entire disclosures of which are incorporated herein by reference.

BACKGROUND OF THE INVENTION

1. Field of the Invention

The present invention relates to a display control device, an imaging device, a display control method, and a computer readable medium storing a display control program.

2. Description of the Related Art

There is black insertion processing of displaying a black image between frames of a motion picture as a method of reducing blurriness of the motion picture which occurs in a case in which a moving object included in a displayed image is tracked in a display device. For example, there is a method of displaying the black image between the frames of the motion picture by turning on the backlight intermittently instead of turning on the backlight at all times. By performing the black insertion processing, the display characteristics of a hold-type display such as a liquid crystal display device can be brought closer to the display characteristics of an impulse-type display, and the blurriness of the motion picture can be reduced. JP2014-035525A, JP2014-032412A, and WO2008/102828A disclose a black insertion technique.

SUMMARY OF THE INVENTION

In the black insertion processing, the effect of reducing the blurriness of the motion picture can be enhanced as the insertion frequency of the black image is increased. However, in a case in which the moving amount of the moving object between frames is equal to or less than the display resolution of the display device, the effect of reducing the blurriness of the motion picture cannot be obtained, and only the demerits such as an increase in power or a decrease in display brightness remain. JP2014-035525A, JP2014-032412A, and WO2008/102828A disclose that black insertion processing is performed in consideration of the movement of the moving object, but the display resolution is not considered.

The present invention has been made in view of the above circumstances, and is to provide a display control device, an imaging device, a display control method, and a computer readable medium storing a display control program capable of efficiently performing insertion of a specific image for reducing the blurriness of the motion picture, improving the displayed image quality, and achieving reduction of power consumption.

A display control device according to an aspect of the present invention is a display control device that performs a display control of motion picture data comprising a specific image insertion control unit that performs an insertion control of displaying a specific image different from the motion picture data on a display unit in a period from displaying a first frame of the motion picture data on the display unit to displaying a second frame subsequent to the first frame of the motion picture data, and an insertion execution control unit that decides whether or not to execute the insertion control based on a moving amount of a moving object included in the motion picture data and an observation angle of one pixel of the motion picture data displayed on the display unit.

An imaging device according to another aspect of the present invention is an imaging device comprising the display control device according to the aspect of the present invention, the display unit, and an imaging element, in which the motion picture data is a live view image of a subject, which is imaged by the imaging element.

A display control method according to still another aspect of the present invention is a display control method of motion picture data comprising a specific image insertion control step of performing an insertion control of displaying a specific image different from the motion picture data on a display unit in a period from displaying a first frame of the motion picture data on the display unit to displaying a second frame subsequent to the first frame of the motion picture data, and an insertion execution control step of deciding whether or not to execute the insertion control based on a moving amount of a moving object included in the motion picture data and an observation angle of one pixel of the motion picture data displayed on the display unit.

A display control program according to still another aspect of the present invention is a display control program that causes a computer to execute processing including deciding whether or not to perform an insertion control of displaying a specific image different from motion picture data on a display unit in a period from displaying a first frame of the motion picture data on the display unit to displaying a second frame subsequent to the first frame of the motion picture data based on a moving amount of a moving object included in the motion picture data and an observation angle of one pixel of the motion picture data displayed on the display unit.

According to the present invention, it is possible to provide a display control device, an imaging device, a display control method, and a display control program capable of efficiently performing insertion of a specific image for reducing the blurriness of the motion picture, improving the displayed image quality, and achieving reduction of power consumption.

DESCRIPTION OF THE PREFERRED EMBODIMENTS

Hereinafter, embodiments of the present invention will be described with reference to the drawings.

Figure 1:
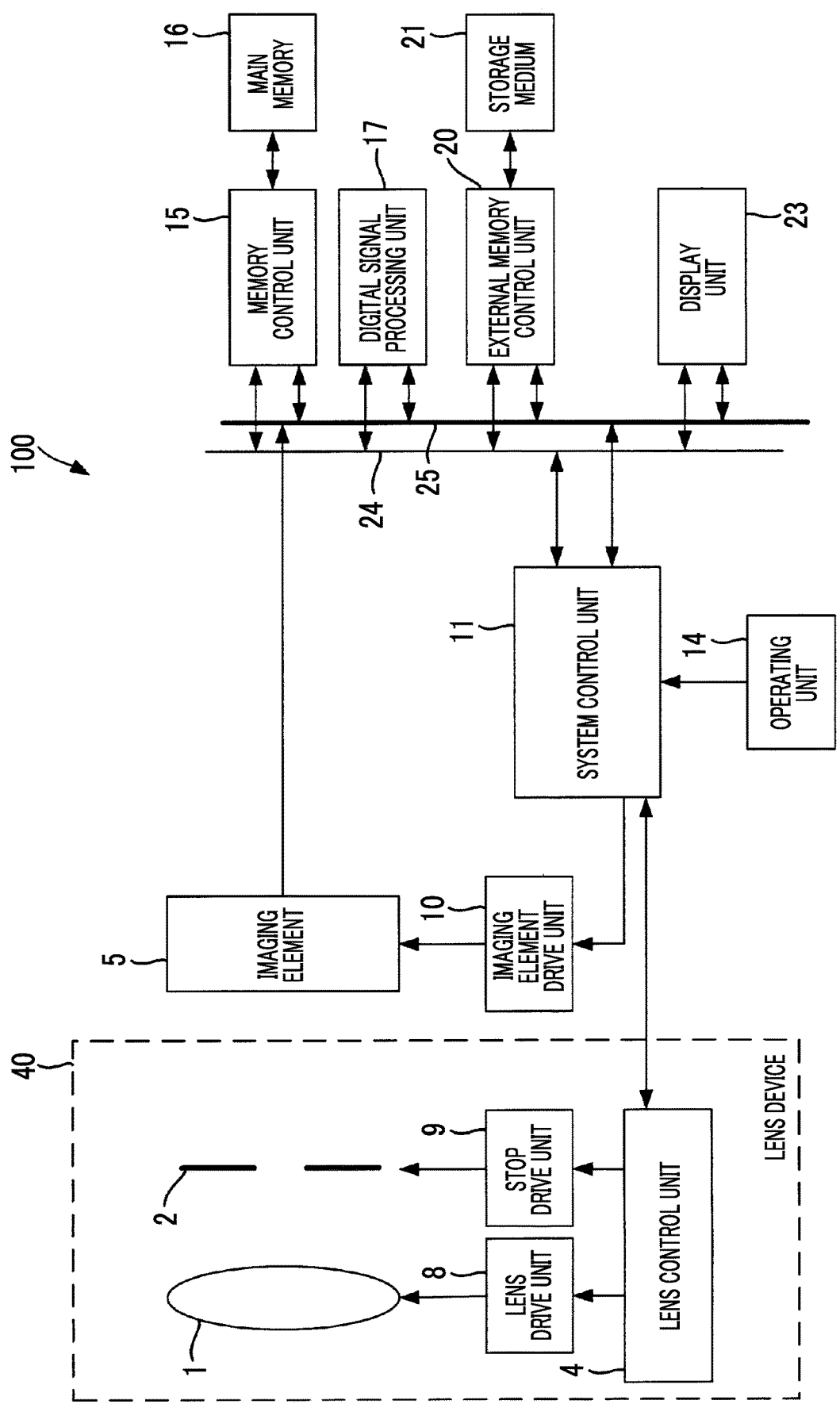
FIG. 1 is a diagram showing a schematic configuration of a digital camera 100, which is an embodiment of an imaging device of the present invention.

FIG. 1 is a diagram showing a schematic configuration of a digital camera 100 which is an embodiment of an imaging device of the present invention.

The digital camera 100 shown in FIG. 1 comprises a lens device 40 which includes an imaging lens 1, a stop 2, a lens control unit 4, a lens drive unit 8, and a stop drive unit 9.

The lens device 40 may be attachable to and detachable from a main body of the digital camera 100, or may be integrated with the main body of the digital camera 100.

The imaging lens 1 and the stop 2 configure an imaging optical system, and the imaging lens 1 includes a focus lens or a zoom lens which can be moved in an optical axis direction.

The focus lens is a lens for adjusting the focus of the imaging optical system, and is composed of a single lens or a plurality of lenses. By the focus lens being moved in the optical axis direction, a position of a principal point of the focus lens is changed along the optical axis direction, and a focal position on a subject side is changed. As the focus lens, a liquid lens of which the focus can be adjusted by changing the position of the principal point in the optical axis direction by electrical control may be used.

The lens control unit 4 of the lens device 40 is configured to be able to communicate with a system control unit 11 of the digital camera 100 by wire or wirelessly.

In accordance with the command from the system control unit 11, the lens control unit 4 controls the focus lens included in the imaging lens 1 via the lens drive unit 8 to change the position of the principal point of the focus lens (to change focal length) or controls the opening amount of the stop 2 via the stop drive unit 9.

The digital camera 100 further comprises an imaging element 5 such as a charge coupled device (CCD) image sensor or a complementary metal oxide semiconductor (CMOS) image sensor which images a subject through the imaging optical system.

The imaging element 5 has an imaging surface in which a plurality of pixels are arranged two-dimensionally, and the subject image formed on the imaging surface by the imaging optical system is converted into pixel signals by the plurality of pixels and output the converted signals. Hereinafter, a set of the pixel signals output from the pixels of the imaging element 5 is referred to as a captured image signal.

The system control unit 11 which controls the entire electric control system of the digital camera 100 in an integrated manner drives the imaging element 5 via an imaging element drive unit 10, and outputs the subject image captured through the imaging optical system of the lens device 40 as the captured image signal.

In a case in which the digital camera 100 is set to an imaging mode, the system control unit 11 starts continuous imaging of the subject by the imaging element 5, and performs a live view display control of displaying, on the display unit 23, a live view image based on motion picture data which includes a plurality of captured image signals output from the imaging element 5 by the continuous imaging. Further, the system control unit 11 performs a recorded motion picture reproduction control of reading out the motion picture data stored in a storage medium 21 and displaying a motion picture based on the motion picture data on the display unit 23.

A command signal from a user is input to the system control unit 11 through an operating unit 14. The system control unit 11 controls the entire digital camera 100 in an integrated manner, and the hardware structure includes various processors that execute the program and perform processing.

Examples of the various processors include a central processing unit (CPU), which is a general-purpose processor that executes a program and performs various processing, programmable logic device (PLD), which is a processor whose circuit configuration can be changed after manufacturing, such as field programmable gate array (FPGA), or a dedicated electric circuit, which is a processor having a circuit configuration specially designed for executing specific processing such as an application specific integrated circuit (ASIC), and the like. The structure of these various processors is, more specifically, an electric circuit in which circuit elements such as semiconductor elements are combined. The system control unit 11 may be configured by one of the various processors, or may be configured by a combination of two or more processors of the same type or different types (for example, a combination of a plurality of the FPGAs or a combination of the CPU and the FPGA).

Further, the electric control system of the digital camera 100 comprises a main memory 16 configured by a random access memory (RAM), a memory control unit 15 that performs a control of data storage in the main memory 16 and readout of the data from the main memory 16, a digital signal processing unit 17 that performs digital signal processing on the captured image signal output from the imaging element 5 and generates captured image data in accordance with various formats such as a joint photographic experts group (JPEG) format, an external memory control unit 20 that performs a control of data storage in the storage medium 21 and readout of the data from the storage medium 21, and the display unit 23.

The display unit 23 is configured by, for example, a liquid crystal display device, an organic electroluminescence (EL) display device, or the like. The display unit 23 includes one or both of an external display device provided on the back surface of the main body of the digital camera 100, which is opposite to the lens device 40 side, and an internal display device built in an eyepiece finder (not shown).

The storage medium 21 is a semiconductor memory such as a flash memory built in the digital camera 100, or a portable semiconductor memory which can be attached to and detached from the digital camera 100.

The memory control unit 15, the digital signal processing unit 17, the external memory control unit 20, and the display unit 23 are connected to each other by a control bus 24 and a data bus 25, and are controlled by the command from the system control unit 11.

Figure 2:
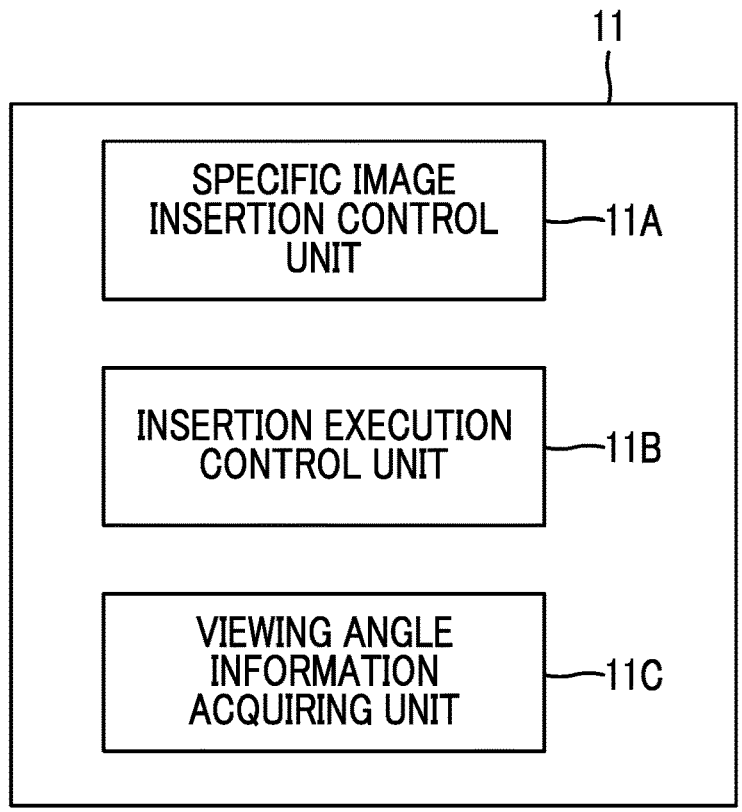
FIG. 2 is a functional block diagram of a system control unit 11 of the digital camera 100 shown in FIG. 1.

FIG. 2 is a functional block diagram of the system control unit 11 of the digital camera 100 shown in FIG. 1.

The system control unit 11 executes a program including a display control program to function as a specific image insertion control unit 11A, an insertion execution control unit 11B, and a viewing angle information acquiring unit 11C. In the present specification, the system control unit 11 configures a display control device.

The specific image insertion control unit 11A performs, during the live view display control or the recorded motion picture reproduction control, an insertion control of displaying a specific image for reducing the blurriness of the motion picture different from the motion picture data which is a display target on the display unit 23 in a period (hereinafter, a length of the period is referred to as one frame time) from displaying a first frame of the motion picture data which is the display target on the display unit 23 to displaying a second frame subsequent to the first frame.

The specific image for reducing the blurriness of the motion picture is an image for reducing the blurriness of the motion picture which occurs when a person tracks a moving object, and is a black image, specifically. The specific image need only be an image other than the first frame which is the display target and the image having a brightness that does not leave an afterimage of the first frame, for example, a white image, a gray image, a random noise image, or the like can also be used in addition to the black image. For example, the display of the black image is realized by turning off the backlight of the display unit 23.

The insertion execution control unit 11B decides whether or not to execute the insertion control based on a moving amount L of the moving object included in the motion picture data which is the display target and an observation angle H of one pixel of the motion picture data which is the display target. The moving amount L of the moving object included in the motion picture data includes a moving amount L1 which is a movement component in the horizontal direction and a moving amount L2 which is a movement component in the vertical direction.

Figure 3:
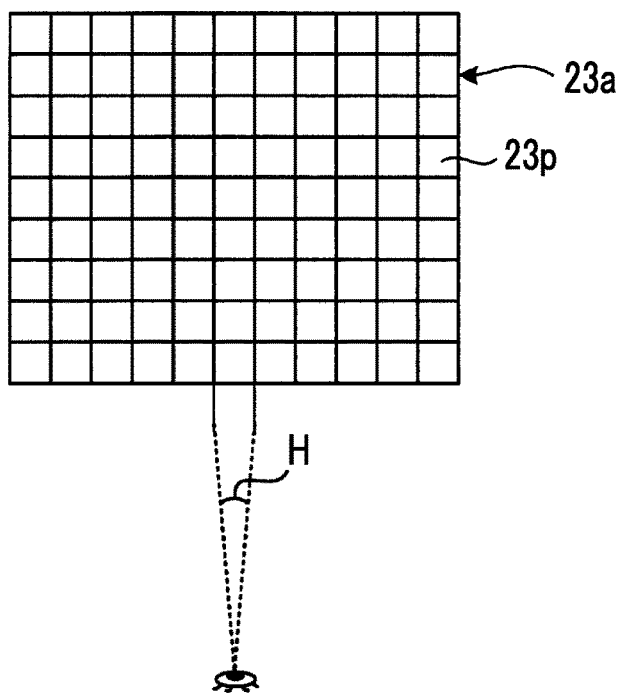
FIG. 3 is a schematic view for explaining an observation angle.
Figure 4:
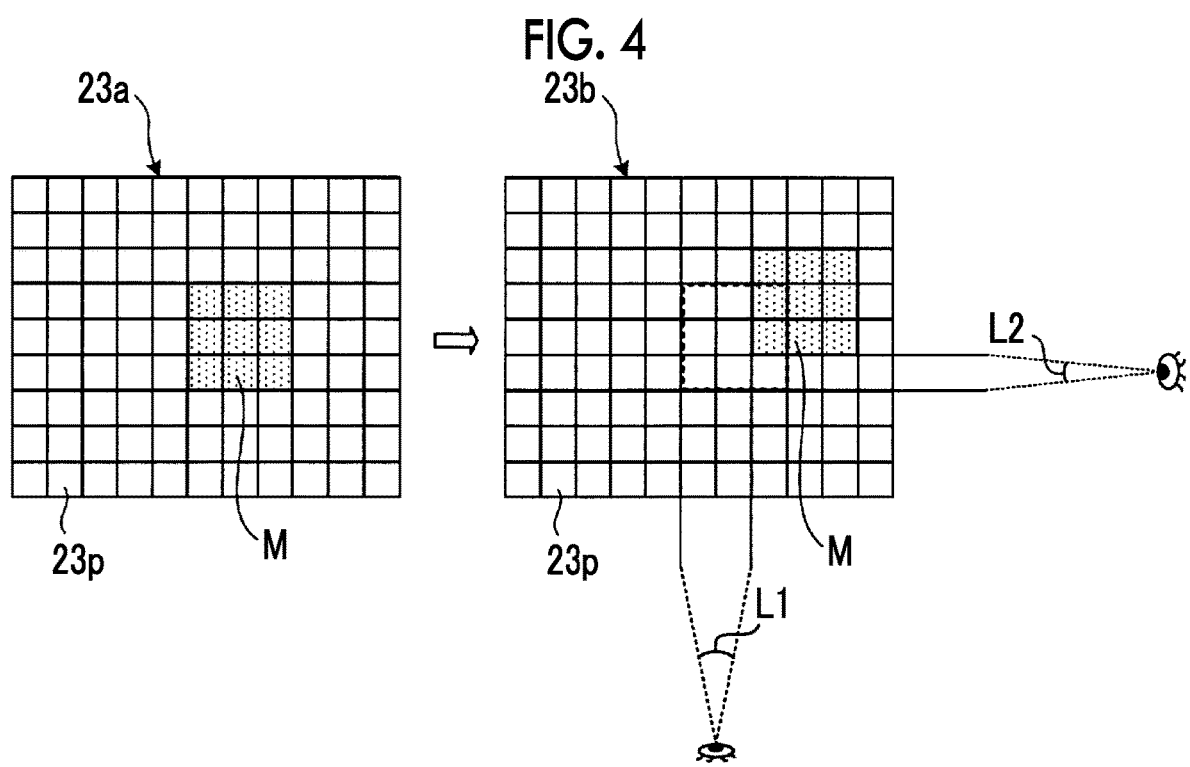
FIG. 4 is a schematic view for explaining a moving amount of a moving object included in motion picture data.

FIG. 3 is a schematic view for explaining the observation angle. FIG. 4 is a schematic view for explaining the moving amount of the moving object included in the motion picture data.

FIG. 3 shows one frame 23a of the motion picture data displayed on the display unit 23. Assuming that the resolution of the frame 23a and the maximum display resolution of the display unit 23 match, the observation angle H is defined by an angle formed by two straight lines connecting both ends of each display pixel (or each pixel 23p which configures the frame 23a) of the display unit 23 in the horizontal direction or vertical direction and the observer's eyes. For example, the observation angle H is obtained by dividing the horizontal viewing angle (defined as an angle of a line connecting the observer's eyes and both ends of the display surface of the display unit 23 in the horizontal direction) of the display unit 23 by the observer by the number of horizontal display pixels of the display unit 23.

The viewing angle of the display unit 23 by the observer may be changed depending on whether the display unit 23 is a first display device or a second display device. In order to respond to the change in usage pattern, information on the viewing angle of the observer in a case in which the first display device is used and information on the viewing angle of the observer in a case in which the second display device is used are stored in the main memory 16 in advance.

FIG. 4 shows the one frame 23a and a subsequent frame 23b of the motion picture data displayed on the display unit 23. The frame 23a and the frame 23b include a moving object M. The moving amount L1 of the moving object M in the horizontal direction is defined as the moving angle of the line of sight in the horizontal direction in one frame of the observer who observes the moving object M. In the example of FIG. 4, the moving object M is moved by two pixels in the horizontal direction between the two frames 23a and 23b. Therefore, in the example of FIG. 4, the moving amount L1 is calculated as a value twice the observation angle H.

Further, the moving amount L2 of the moving object M in the vertical direction is defined as a moving angle of the line of sight in the vertical direction in one frame of the observer who observes the moving object M. In the example of FIG. 4, the moving object M is moved by one pixel in the vertical direction between the two frames 23a and 23b. Therefore, in the example of FIG. 4, the moving amount L2 is calculated as a value one times the observation angle H.

According to the above definition, upper limit values of the moving amounts L1 and L2 are a value obtained by multiplying the observation angle H by the number of display pixels in the horizontal direction or vertical direction of the display unit 23. However, in a case in which the moving amount of the moving object exceeds a pursuit limit moving amount, which is a limit value at which a person can track the moving object per frame time, a person cannot recognize the movement of the moving object which is moved exceeding the pursuit limit moving amount. Therefore, it is preferable that the upper limit values of the moving amounts L1 and L2 that can be set be the pursuit limit moving amounts.

The viewing angle information acquiring unit 11C acquires the information on the viewing angle of the display unit 23 by the observer from the main memory 16. The insertion execution control unit 11B sets the observation angle H based on this information, and decides whether or not to execute the insertion control performed by the specific image insertion control unit 11A based on the set observation angle H and the separately set moving amounts L1 and L2.

Figure 5:
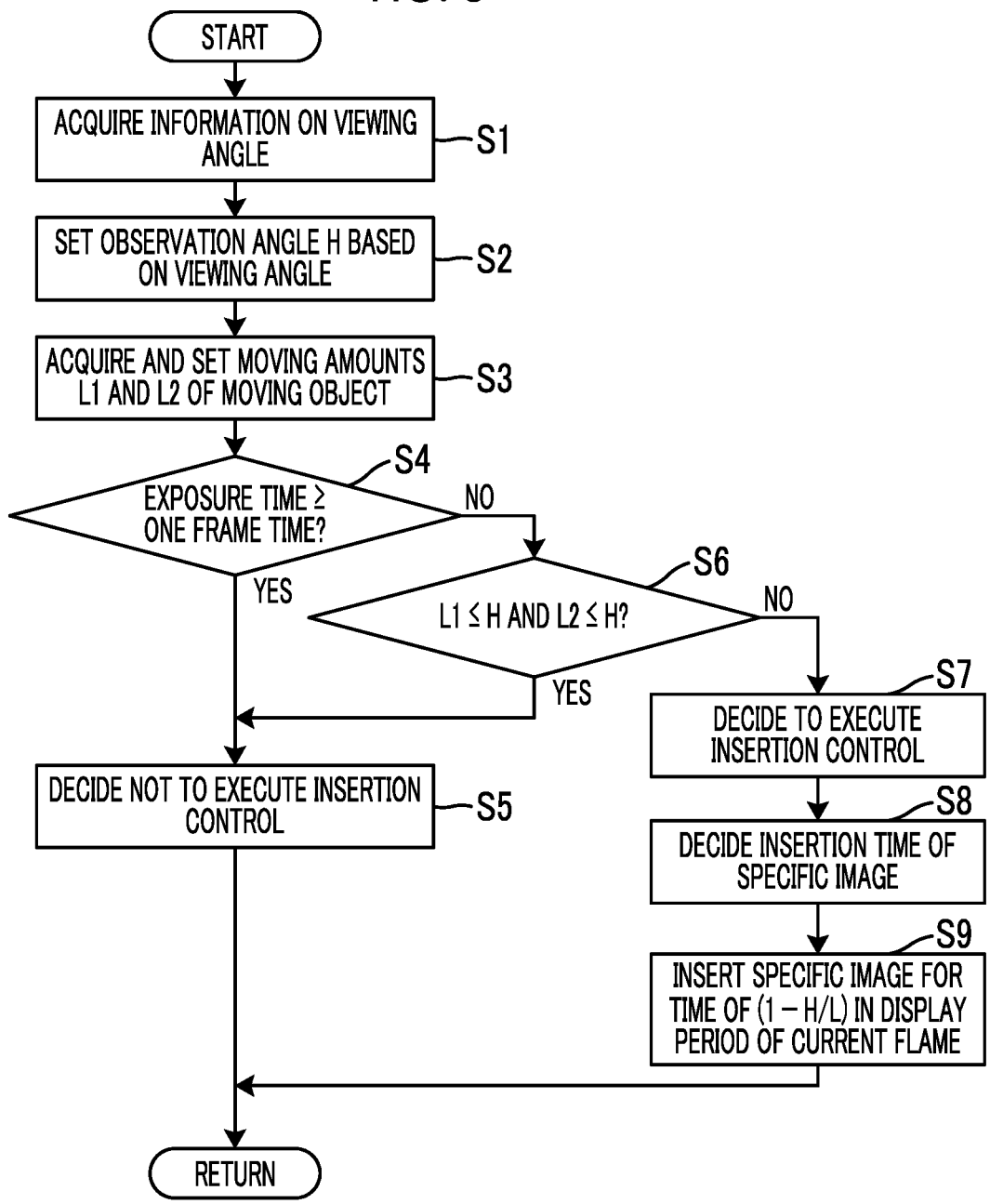
FIG. 5 is a flowchart for explaining the operation during live view display control or recorded motion picture reproduction control by the system control unit 11.

FIG. 5 is a flowchart for explaining the operation during the live view display control or the recorded motion picture reproduction control by the system control unit 11. In a case in which one frame of the motion picture data which is the display target (hereinafter referred to as a current frame) is generated, the viewing angle information acquiring unit 11C first determines whether the first display device or the second display device is used, and acquires the information on the viewing angle of the observer stored in the main memory 16, which corresponds to the used display device (step S1).

The viewing angle information acquiring unit 11C determines that the second display device is used in a situation in which the observer's eyes are in contact with an eyepiece window (not shown), and determines that the first display device is used in a situation in which the observer's eyes are not in contact with the eyepiece window.

Next, the insertion execution control unit 11B sets the observation angle H based on the information on the viewing angle acquired in step S1 (step S2). The insertion execution control unit 11B calculates and sets the observation angle H based on, for example, the information of the viewing angle acquired in step S1 and the information of the maximum display resolution of the display unit 23. The information of the viewing angle and the observation angle H may be associated with each other and stored in the main memory 16 in advance, and the insertion execution control unit 11B may set the observation angle H corresponding to the information of the viewing angle acquired in step S1 in the main memory by reading out the observation angle H from the main memory 16.

Next, the insertion execution control unit 11B acquires and sets the moving amount of the moving object included in the current frame (step S3). For example, the insertion execution control unit 11B performs moving object detection processing with respect to the motion picture data which is the display target, calculates the moving amount L1 of the moving object in the horizontal direction by multiplying the observation angle H by the number of moving pixels of the detected moving object in the horizontal direction, calculates the moving amount L2 of the moving object in the vertical direction by multiplying the observation angle H by the number of moving pixels of the detected moving object in the vertical direction, and sets the values.

At an initial point in time when only one frame or several frames can be acquired as the frame of the motion picture data, the moving object detection processing cannot be performed. Therefore, at this initial point in time, the insertion execution control unit 11B need only set the moving amounts L1 and L2 by acquiring the pursuit limit moving amount described above from the main memory 16.

Next, the insertion execution control unit 11B acquires information on exposure time of the current frame, and determines whether or not the exposure time is equal to or more than one frame time (value obtained by dividing 1 second by the number of frames displayed in that 1 second) based on the frame rate of the motion picture data which is the display target (step S4).

In a case in which the exposure time is equal to or more than one frame time, it is assumed that the blur of the motion picture data is large, so that there is a high possibility that the effect of reducing the blurriness by performing the insertion control is weakened. Therefore, in a case in which the exposure time is equal to or more than one frame time (step S4: YES), the insertion execution control unit 11B decides not to execute the insertion control of the specific image (step S5). As a result, it is a state in which the insertion control by the specific image insertion control unit 11A is not performed (state in which the current frame is displayed over one frame time).

On the other hand, in a case in which the exposure time is less than one frame time, the effect of reducing the blurriness by performing the insertion control can be expected depending on the moving amount of the moving object. Therefore, in a case in which the exposure time is less than one frame time (step S4: NO), the insertion execution control unit 11B determines whether or not each of the moving amount L1 and the moving amount L2 is equal to or less than the observation angle H (step S6).

In a state in which each of the moving amount L1 and the moving amount L2 is equal to or less than the observation angle H, the effect of reducing the blurriness of the motion picture by performing the insertion control cannot be obtained in principle. Therefore, in a case in which each of the moving amount L1 and the moving amount L2 is equal to or less than the observation angle H (step S6: YES), the insertion execution control unit 11B shifts the process to step S5.

On the other hand, in a state in which any of the moving amount L1 or the moving amount L2 exceeds the observation angle H, the blurriness of the motion picture can be reduced by performing the insertion control. Therefore, in a case in which any of the moving amount L1 or the moving amount L2 exceeds the observation angle H (step S6: NO), the insertion execution control unit 11B decides to execute the insertion control (step S7).

In a case in which it is decided to perform the insertion control in step S7, the specific image insertion control unit 11A selects the larger amount (any one in a case in which the moving amounts L1 and L2 have the same value) of the moving amounts L1 and L2 set in step S3. Then, the specific image insertion control unit 11A decides display time BT of the specific image in display time FT of the current frame by calculation of Equation (A) below based on the observation angle H set in step S2 and the moving amount L1 in a case in which the moving amount L1 is selected, and decides the display time BT of the specific image in the display time FT of the current frame by calculation of Equation (B) below based on the observation angle H set in step S2 and the moving amount L2 in a case in which the moving amount L2 is selected (step S8).

$$BT=FT \times \{1-(H/L1)\} \quad (A)$$

$$BT=FT \times \{1-(H/L2)\} \quad (B)$$

After the display time BT is decided in step S8, the specific image insertion control unit 11A performs a control of displaying the specific image for the display time BT on the display unit 23 instead of the current frame after the (FT-BT) time has elapsed from starting the display of the current frame (step S9). As a result, in the one frame period in which the current frame is to be displayed, the specific image is displayed for the display time BT, and the current frame is displayed for the remaining time. After step S5 and step S9, in a case in which the frame subsequent to the current frame is generated, the process returns to step S1.

As described above, with the digital camera 100, the insertion control of the specific image can be performed only in a case in which any of the moving amount L1 or the moving amount L2 exceeds the observation angle H. Stated another way, the insertion control is not executed in a situation in which the effect of reducing the blurriness of the motion picture cannot be expected. Therefore, as compared with the case in which the insertion control is always performed, the period during which brightness improving processing of the displayed image is not required in a case in which the insertion control is performed is increased, so that the power consumption can be reduced.

The process of step S4 is not essential in FIG. 5, and the operation may proceed to step S6 after the process of step S3. Even in this operation, whether or not to execute the insertion control is decided by the relationship between the moving amounts L1 and L2 of the moving object and the observation angle H. Therefore, it is possible to achieve both reduction of the blurriness of the motion picture and low power consumption.

In a state in which the first display device is used as the display unit 23, the viewing angle information acquiring unit 11C according to the present embodiment may acquire the information on the viewing angle by calculating the distance between the display unit 23 and the face of the observer by a distance sensor or the like provided on the back surface of the main body of the digital camera 100 and calculating the viewing angle of the display unit 23 by the observer based on the calculated distance. In this configuration, the viewing angle information acquiring unit 11C configures a viewing angle calculating unit. With this configuration, the viewing angle of the observer in the state in which the first display device is used can be brought close to an accurate value, so that the execution frequency of the insertion control can be made more optimum.

Figure 6:
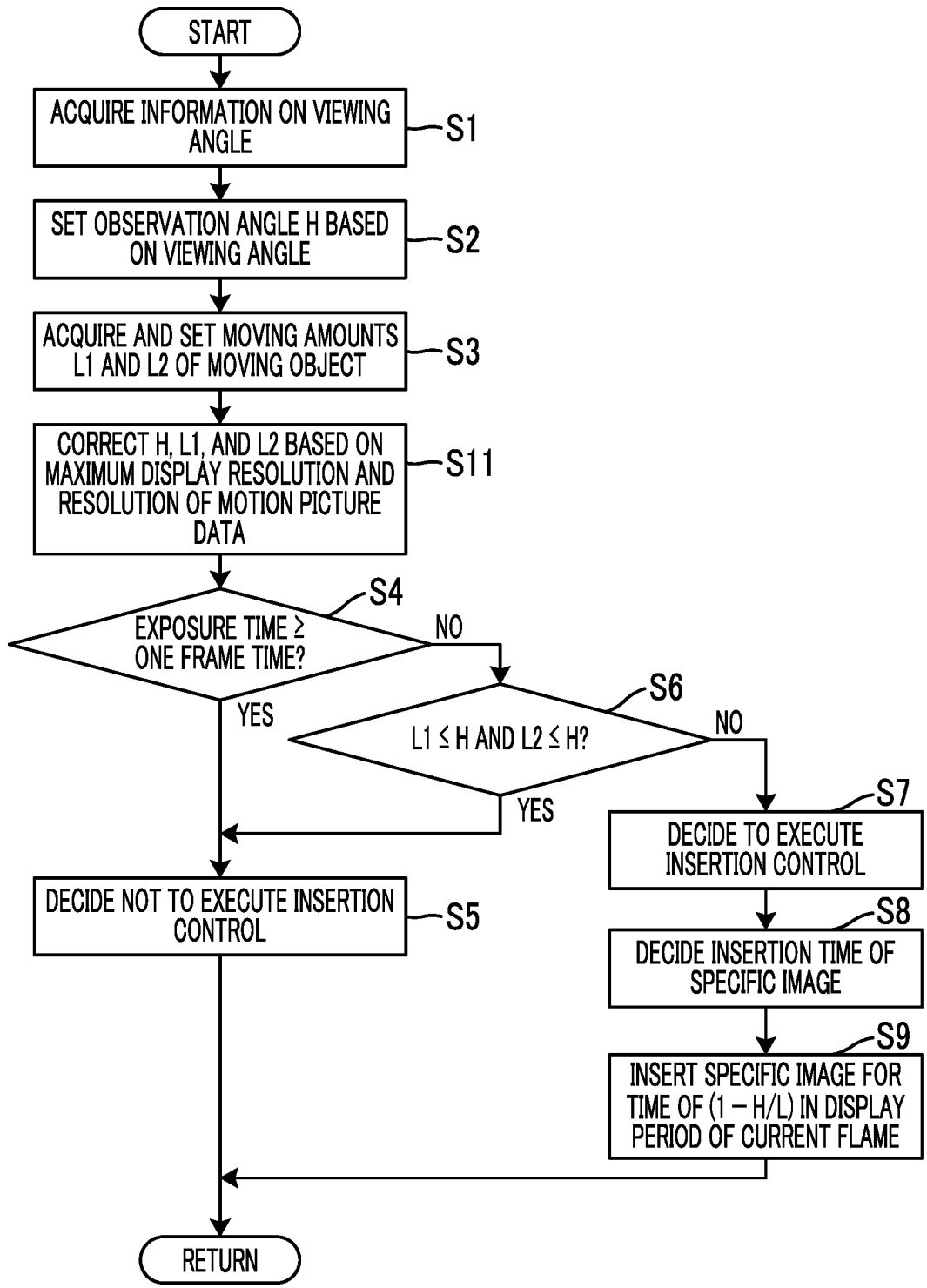
FIG. 6 is a flowchart for explaining a first modification example of the operation of the system control unit 11 shown in FIG. 1.

FIG. 6 is a flowchart for explaining a first modification example of the operation of the system control unit 11 shown in FIG. 1. The flowchart shown in FIG. 6 is the same as that of FIG. 5 except that step S11 is added between step S3 and step S4. In FIG. 6, the same process as in FIG. 5 is designated by the same reference numeral and the description thereof will be omitted.

After step S3, the insertion execution control unit 11B corrects the observation angle H set in step S2 and the moving amounts L1 and L2 set in step S3 based on the resolution of the motion picture data which is the display target and the maximum display resolution of the display unit 23 (step S11).

For example, a case is assumed in which the resolution of the motion picture data is ¼ of the maximum display resolution of the display unit 23. In this case, the size of each frame of the motion picture data is enlarged twice and displayed on the display unit 23. That is, one pixel of the motion picture data is displayed in four display pixels of the display unit 23. In this case, the observation angle H when the observer observes one pixel of the motion picture data is twice the observation angle H set in step S2. Further, the moving amounts L1 and L2, which are the moving angles of the line of sight when the observer tracks the moving object included in the motion picture data, are twice the moving amounts L1 and L2 set in step S3.

Specifically, in step S11, the insertion execution control unit 11B uses a value of ½ of the value obtained by dividing the maximum display resolution of the display unit 23 by the resolution of the motion picture data as a correction coefficient, multiplies each of the observation angle H set in step S2 and the moving amount L1 and the moving amount L2 set in step S3 by this correction coefficient, and corrects these values. In step S6 or step S9 performed after step S11, process is performed in accordance with the observation angle H, the moving amount L1, and the moving amount L2 which are corrected.

As described above, by correcting the observation angle H, the moving amount L1, and the moving amount L2 based on the resolution of the motion picture data and the maximum display resolution of the display unit 23, the insertion control is efficiently executed regardless of the resolution of the motion picture data.

Figure 7:
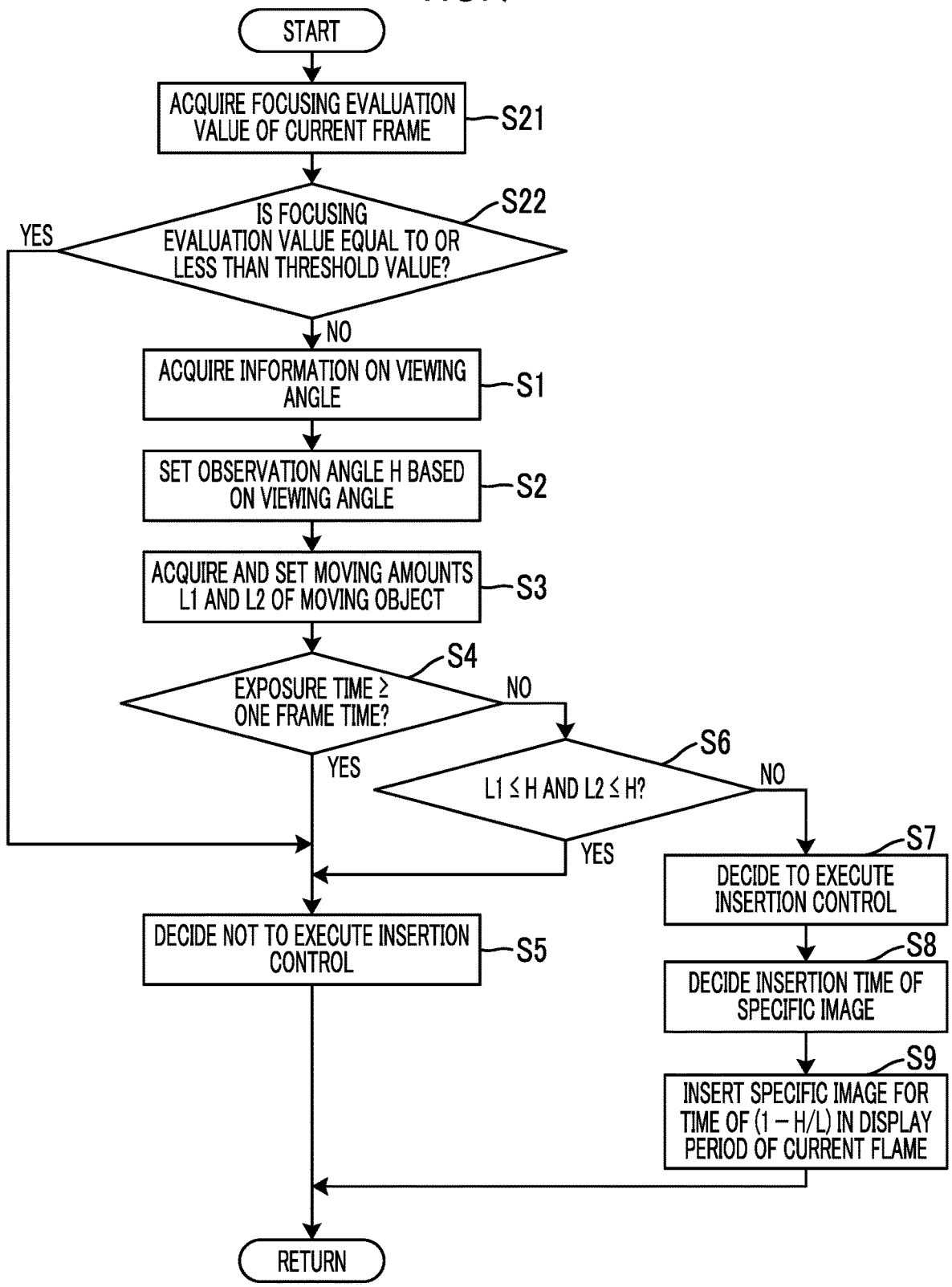
FIG. 7 is a flowchart for explaining a second modification example of the operation of the system control unit 11 shown in FIG. 1.

FIG. 7 is a flowchart for explaining a second modification example of the operation of the system control unit 11 shown in FIG. 1. The flowchart shown in FIG. 7 is the same as that of FIG. 5 except that step S21 and step S22 are added before step S1. In FIG. 7, the same process as in FIG. 5 is designated by the same reference numeral and the description thereof will be omitted.

In a case in which the current frame is generated, the insertion execution control unit 11B acquires a focusing evaluation value of the current frame (step S21). The insertion execution control unit 11B calculates, for example, a contrast value of the current frame and acquires the contrast value as the focusing evaluation value. Alternatively, in a case in which the imaging element 5 includes a phase difference detection pixel, the insertion execution control unit 11B uses the signal of the phase difference detection pixel included in the captured image signal that is the generation source of the current frame to calculate a defocus amount and acquires the defocus amount as the focusing evaluation value.

Next, the insertion execution control unit 11B determines whether or not the focusing evaluation value is equal to or less than a predetermined threshold value (step S22). In a case in which the focusing evaluation value is equal to or less than the threshold value (step S22: YES), the process proceeds to step S5. On the other hand, in a case in which the focusing evaluation value exceeds the threshold value (step S22: NO), the process proceeds to step S1.

As described above, in a case in which the focusing evaluation value of the current frame is equal to or less than the threshold value, it is decided not to execute the insertion control of the specific image, and the normal control of displaying the current frame over one frame time is performed. The frame with a low focusing evaluation value means an image with a lot of blurriness. Therefore, in such a case, it is difficult to obtain the effect of reducing the blurriness of the motion picture by performing the insertion control. Therefore, in such a case, by omitting the processes of step S1 to step S4 and step S6 to step S9, the possibility that the insertion control is to be executed can be reduced, and the power consumption can be reduced. Further, the processes of step S1 to step S4 and step S6 to step S9 are not performed, so that the load on the system control unit 11 can be reduced.

Figure 8:
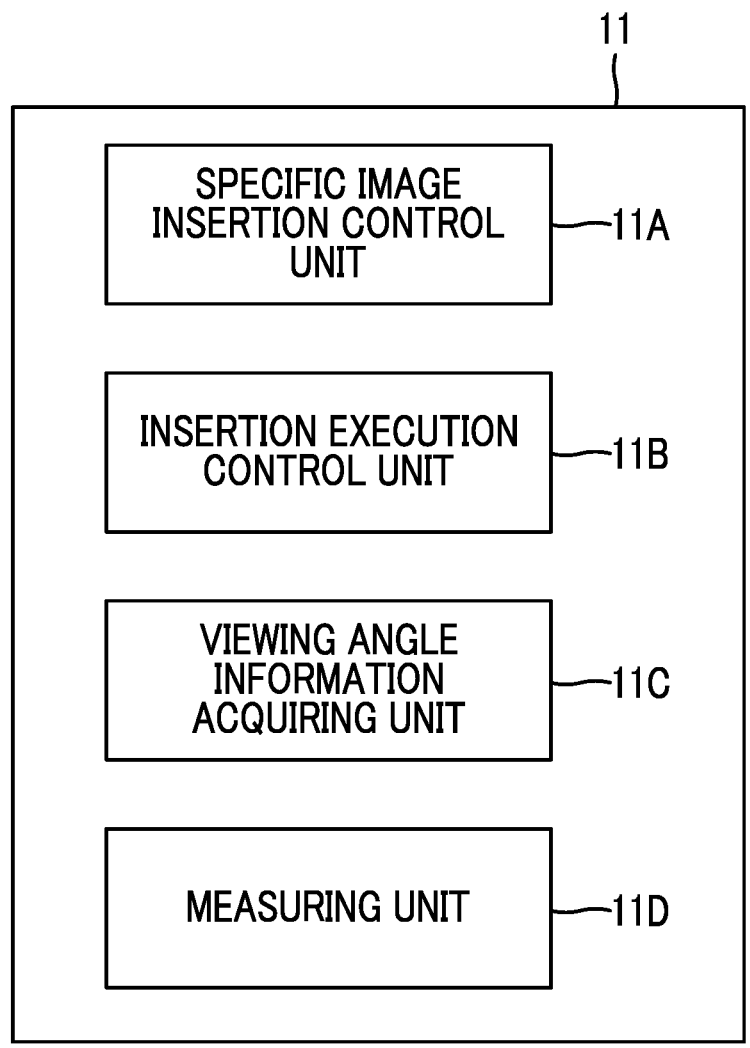
FIG. 8 is a diagram showing a modification example of functional blocks of the system control unit 11 shown in FIG. 2.

FIG. 8 is a diagram showing a modification example of the functional blocks of the system control unit 11 shown in FIG. 2. The functional blocks of the system control unit 11 shown in FIG. 8 are the same as that of FIG. 2 except that a measuring unit 11D is added. The measuring unit 11D is realized by the processor executing the display control program described above.

The measuring unit 11D measures the pursuit limit moving amount of the observer of the display unit 23, which is described above. For example, the measuring unit 11D displays a predetermined pattern (for example, a pattern in which three lines are arranged at intervals) on the display unit 23, and moves this pattern at a speed of a plurality of steps (the number of moving pixels per frame time). Further, the user is made to input whether or not the three lines included in the pattern which is moved at each speed can be recognized without overlapping, and the maximum value of the speeds which can be recognized without the three lines overlapping is determined. Then, the moving amount of this maximum value is converted into the moving angle of the line of sight of the observer, and this moving angle is stored as a measurement result of the pursuit limit moving amount.

In the modification example shown in FIG. 8, the pursuit limit moving amount set as the moving amounts L1 and L2 at the initial point in time when the generation of the motion picture data frame is started is replaced with the pursuit limit moving amount measured by the measuring unit 11D. Further, the pursuit limit moving amount set as the upper limit value of the moving amounts L1 and L2 is replaced with the pursuit limit moving amount measured by the measuring unit 11D.

With the configuration of this modification example, the pursuit limit moving amount can be optimized depending on the pursuit ability of the observer, so that it is possible to determine whether or not to execute the insertion control depending on the observer.

In the above description, the operations of FIGS. 5 to 8 are performed during the live view display control or the recorded motion picture reproduction control of the digital camera 100. However, the operations of FIGS. 5 to 8 can be similarly applied to a case in which the motion picture data is reproduced by the electronic device including the display unit such as a case in which the motion picture data recorded on the recording medium is reproduced on a television. In order to realize the operation shown in FIG. 7 with a device other than the digital camera, the information on the focusing evaluation value need only be recorded corresponding to each frame of the motion picture data recorded on the recording medium.

Hereinafter, a configuration of a smartphone will be described as another embodiment of the imaging device of the present invention.

Figure 9:
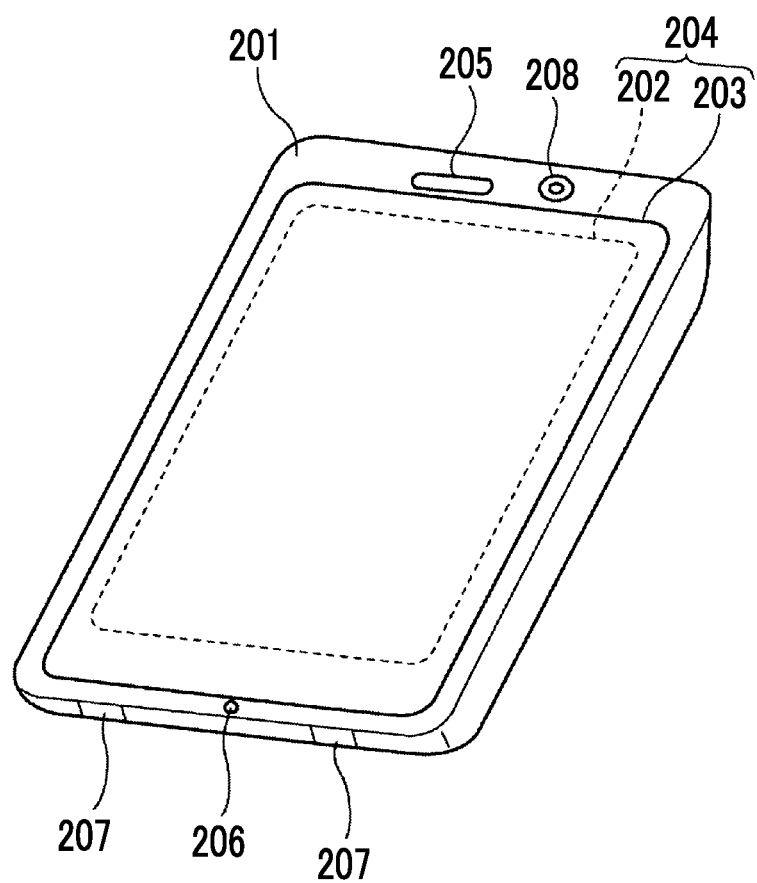
FIG. 9 is a view showing the appearance of a smartphone 200, which is an embodiment of an imaging device of the present invention.

FIG. 9 is a view showing the appearance of a smartphone 200 which is an embodiment of an imaging device of the present invention.

The smartphone 200 shown in FIG. 9 comprises a flat plate-shaped housing 201, and a display input unit 204 in which a display panel 202 as a display unit and an operation panel 203 as an input unit are integrated on one surface of the housing 201.

Further, the housing 201 comprises a speaker 205, a microphone 206, an operating unit 207, and a camera unit 208. The configuration of the housing 201 is not limited to this, and for example, a configuration in which the display unit and the input unit are separately provided, or a configuration having a folding structure or a slide mechanism can be adopted.

Figure 10:
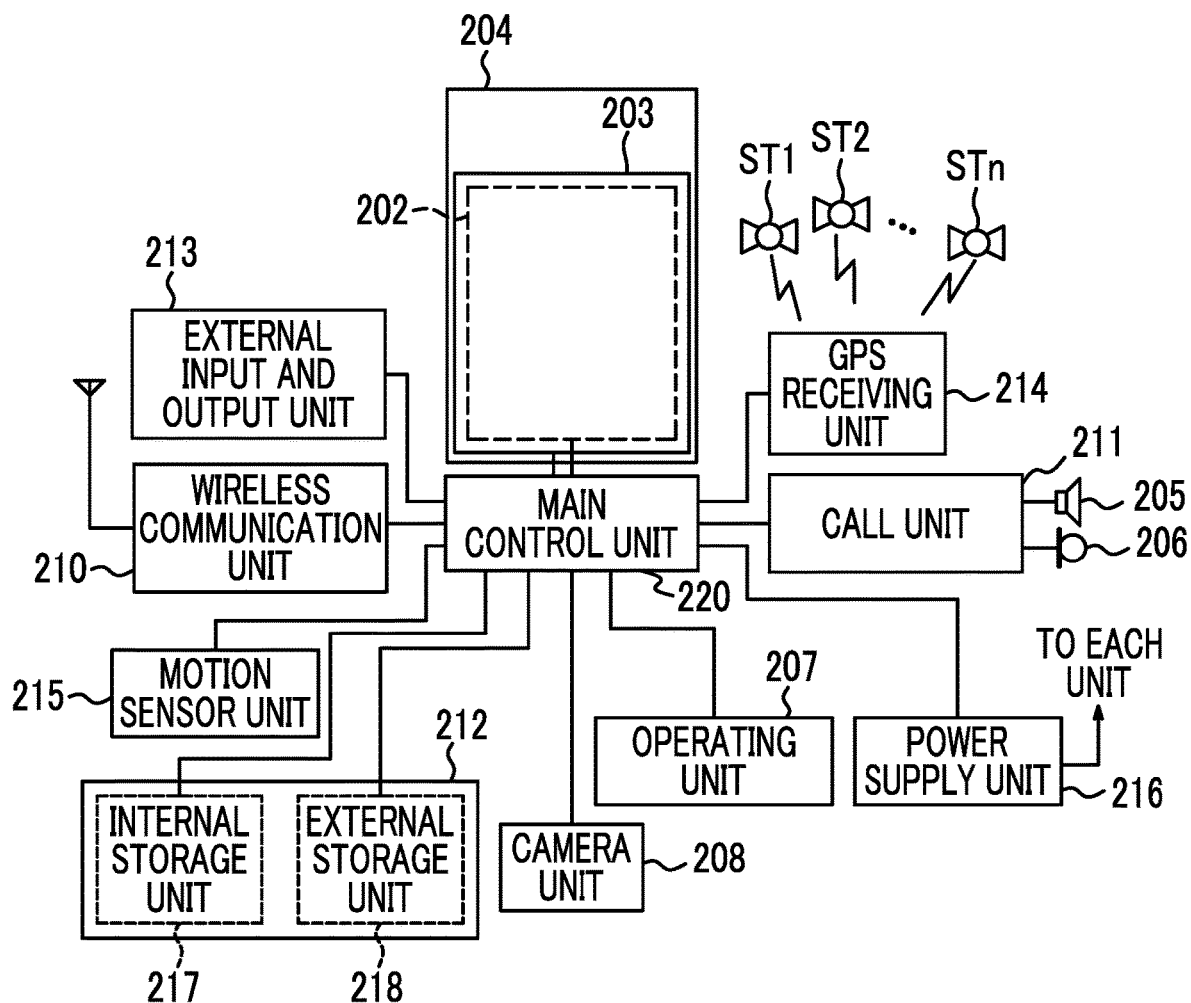
FIG. 10 is a block diagram showing a configuration of the smartphone 200 shown in FIG. 9.

FIG. 10 is a block diagram showing a configuration of the smartphone 200 shown in FIG. 9.

As shown in FIG. 10, the smartphone comprises, as main components, a wireless communication unit 210, the display input unit 204, a call unit 211, the operating unit 207, the camera unit 208, a storage unit 212, an external input and output unit 213, a global positioning system (GPS) receiving unit 214, a motion sensor unit 215, a power supply unit 216, and a main control unit 220.

The smartphone 200 has, as a main function, a wireless communication function for performing mobile wireless communication via a base station device BS (not shown) and a mobile communication network NW (not shown).

The wireless communication unit 210 performs wireless communication with the base station device BS accommodated in the mobile communication network NW in accordance with the command of the main control unit 220. Using the wireless communication, the transmission and reception of various file data, such as voice data and image data, e-mail data, and reception of web data, or streaming data, is performed.

The display input unit 204 is a so-called touch panel that displays images (still picture images and motion picture images) or text information under the control of the main control unit 220 to visually transmit the information to the user, and detects the user's operation to the displayed information, and comprises the display panel 202 and the operation panel 203.

The display panel 202 uses a liquid crystal display (LCD) or an organic electro-luminescence display (OELD) as a display device.

The operation panel 203 is a device which is placed to be capable of visually recognizing the image displayed on the display surface of the display panel 202, and is operated by the user's finger or a stylus to detect one or a plurality of coordinates. In a case in which the device is operated by the user's finger or the stylus, detection signals generated due to the operation are output to the main control unit 220. Then, the main control unit 220 detects an operation position (coordinate) on the display panel 202 based on the received detection signals.

As shown in FIG. 10, in the smartphone 200 as the embodiment of the imaging device of the present invention, the display panel 202 and the operation panel 203 are integrated to configure the display input unit 204, and the operation panel 203 is disposed to completely cover the display panel 202.

In a case in which such a disposition is adopted, the operation panel 203 may have a function of detecting the user's operation even in an area outside the display panel 202. Stated another way, the operation panel 203 may comprise a detection area for the overlapping portion (hereinafter, referred to as a display area) that overlaps the display panel 202, and a detection area for the outer edge portion (hereinafter, referred to as a non-display area) that does not overlap the display panel 202 other than the overlapping portion.

The size of the display area and the size of the display panel 202 may completely match, but it is not always necessary to match the sizes. Also, the operation panel 203 may comprise two sensitive areas in the outer edge portion and the inner portion other than the outer edge portion. Further, the width of the outer edge portion is appropriately designed depending on the size of the housing 201 and the like.

Furthermore, examples of a position detection method adopted in the operation panel 203 include a matrix switch method, a resistive film method, a surface acoustic wave method, an infrared method, an electromagnetic induction method, and a capacitance method, and any method can be adopted.

The call unit 211 comprises the speaker 205 or the microphone 206, and converts the user's voice which is input through the microphone 206 into voice data which can be processed by the main control unit 220 to output the converted voice data to the main control unit 220, or decodes the voice data received by the wireless communication unit 210 or the external input and output unit 213 to output the decoded voice data through the speaker 205.

As shown in FIG. 9, for example, the speaker 205 can be mounted on the same surface in which the display input unit 204 is provided, and the microphone 206 can be mounted on the side surface of the housing 201.

The operating unit 207 is a hardware key using a key switch or the like, and receives the command of the user. For example, as shown in FIG. 9, the operating unit 207 is mounted on the side surface of the housing 201 of the smartphone 200, and is a push button type switch that is turned on in a case of being pressed with a finger or the like and is turned off by a restoring force such as a spring in a case where the finger is released.

The storage unit 212 stores a control program and control data of the main control unit 220, application software, address data associated with the name or telephone number of a communication partner, data of transmitted and received e-mails, Web data downloaded from Web browsing, and downloaded content data, and temporarily stores streaming data and the like. The storage unit 212 is configured by an internal storage unit 217 built in the smartphone and an external storage unit 218 which has a slot for an attachable and detachable external memory.

Each of the internal storage unit 217 and the external storage unit 218 which configure the storage unit 212 is realized by using a storage medium such as a memory of a flash memory type, hard disk type, a multimedia card micro type, or a card type (for example, MicroSD (registered trademark) memory), a random access memory (RAM), a read only memory (ROM), and the like.

The external input and output unit 213 serves as an interface with all of the external devices connected to the smartphone 200, and is directly or indirectly connected to other external devices through communication (for example, a universal serial bus (USB), IEEE 1394, or the like), or a network (for example, the Internet, wireless LAN, Bluetooth (registered trademark), radio frequency identification (RFID), infrared data association (IrDA; registered trademark), ultra wideband (UWB; registered trademark), Zig-Bee (registered trademark), or the like).

Examples of the external devices connected to the smartphone 200 include a wired/wireless headset, a wired/wireless external charger, a wired/wireless data port, a memory card and a subscriber identity module (SIM)/user identity module (UIM) card connected via a card socket, external audio and video devices connected via audio and video input/output (I/O) terminals, wirelessly connected external audio and video devices, a wired/wirelessly connected smartphone, a wired/wirelessly connected personal computer, earphones, and the like.

The external input and output unit 213 can transmit data transmitted from such external devices to the components inside the smartphone 200, or transmit data inside the smartphone 200 to the external devices.

The GPS receiving unit 214 receives GPS signals transmitted from GPS satellites ST1 to STn in accordance with the command of the main control unit 220, and executes positioning calculation processing based on a plurality of the received GPS signals to detect the position of the smartphone 200 including latitude, longitude, and altitude. In a case in which positional information can be acquired from the wireless communication unit 210 or the external input and output unit 213 (for example, wireless LAN), the GPS receiving unit 214 can detect the position by using the positional information.

The motion sensor unit 215 comprises, for example, a three-axis acceleration sensor, and detects the physical movement of the smartphone 200 in accordance with the command of the main control unit 220. By detecting the physical movement of the smartphone 200, the moving direction or the acceleration of the smartphone 200 is detected. The detection result is output to the main control unit 220.

The power supply unit 216 supplies a power stored in a battery (not shown) to each unit of the smartphone 200 in accordance with the command of the main control unit 220.

The main control unit 220 comprises a microprocessor, operates in accordance with the control program and the control data stored in the storage unit 212, and controls the units of the smartphone 200 in an integrated manner. The main control unit 220 has a mobile communication control function of controlling the units of the communication system, and an application processing function in order to perform voice communication or data communication through the wireless communication unit 210.

The application processing function is realized by the main control unit 220 which operates in accordance with the application software stored in the storage unit 212. Examples of the application processing function include an infrared ray communication function of controlling the external input and output unit 213 to perform data communication with an opposite device, an e-mail function of performing transmission and reception of e-mail, or a web browsing function of browsing a web page.

Also, the main control unit 220 has an image processing function of displaying an image on the display input unit 204 based on the image data (data of still picture image or motion picture images) such as received data or downloaded streaming data.

The image processing function is a function in which the main control unit 220 decodes the image data, performs image processing on the decoding result, and displays the image on the display input unit 204.

Further, the main control unit 220 executes display control with respect to the display panel 202 and operation detecting control of detecting the user's operation through the operating unit 207 and the operation panel 203.

By executing the display control, the main control unit 220 displays a software key such as an icon or a scroll bar for starting an application software, or displays a window for creating an e-mail.

The scroll bar is a software key for receiving a command to move a displayed portion of the image for a large image that cannot fit in the display area of the display panel 202.

By executing the operation detecting control, the main control unit 220 detects the user's operation through the operating unit 207, receives the operation with respect to the icon and an input of the character string for the input field of the window through the operation panel 203, or receives a scroll request of the displayed image through the scroll bar.

By executing the operation detecting control, the main control unit 220 has a touch panel control function of determining whether the operation position on the operation panel 203 is the overlapping portion (display area) that overlaps the display panel 202 or the outer edge portion (non-display area) that does not overlap the display panel 202 other than the overlapping portion, and controlling the sensitive area of the operation panel 203 and the display position of the software key.

The main control unit 220 can detect a gesture operation on the operation panel 203 and execute a preset function in accordance with the detected gesture operation.

The gesture operation is not a usual simple touch operation, but is an operation of drawing a locus with fingers, designating a plurality of positions at the same time, or combining these operations to draw a locus for at least one from a plurality of positions.

The camera unit 208 includes configurations other than the external memory control unit 20, the storage medium 21, the display unit 23, and the operating unit 14 in the digital camera shown in FIG. 1.

The captured image data generated by the camera unit 208 can be stored in the storage unit 212 or can be output through the external input and output unit 213 or the wireless communication unit 210.

In the smartphone 200 shown in FIG. 9, the camera unit 208 is mounted on the same surface as the display input unit 204, but the mounting position of the camera unit 208 is not limited thereto, and the camera unit 208 may be mounted on the back surface of the display input unit 204.

The camera unit 208 can be used for various functions of the smartphone 200. For example, the image acquired by the camera unit 208 can be displayed on the display panel 202, or the image from the camera unit 208 can be used as one of operation input of the operation panel 203.

In a case in which the GPS receiving unit 214 detects the position, the position can be detected by referring to the image from the camera unit 208. Further, the optical axis direction of the camera unit 208 of the smartphone 200 can be determined or the current usage environment can be determined by referring the image from the camera unit 208 without using the three-axis acceleration sensor or using a combination of the image and the three-axis acceleration sensor. Needless to say, the image from the camera unit 208 can be used in the application software.

In addition, the image data of the still picture or the motion picture can be stored in the storage unit 212 with the positional information acquired by the GPS receiving unit 214, the voice information (it may be the text information acquired by converting the voice to the text by the main control unit) acquired by the microphone 206, or the posture information acquired by the motion sensor unit 215, or can be output through the external input and output unit 213 or the wireless communication unit 210.

Even in the smartphone 200 having the above configuration, it is possible to optimize the execution frequency of the insertion control of the specific image to achieve power saving.

As described above, the following matters are disclosed in the present specification.

(1)

A display control device that performs a display control of motion picture data, the device comprising a specific image insertion control unit that performs an insertion control of displaying a specific image different from the motion picture data on a display unit in a period from displaying a first frame of the motion picture data on the display unit to displaying a second frame subsequent to the first frame of the motion picture data, and an insertion execution control unit that decides whether or not to execute the insertion control based on a moving amount of a moving object included in the motion picture data and an observation angle of one pixel of the motion picture data displayed on the display unit.

(2)

The display control device according to (1), in which the moving amount is a moving angle of a line of sight of an observer who observes the moving object, and the insertion execution control unit decides not to execute the insertion control in a case in which the moving angle is equal to or less than the observation angle, and decides to execute the insertion control in a case in which the moving angle exceeds the observation angle.

(3)

The display control device according to (1) or (2), in which the specific image insertion control unit controls display time of the specific image in the period based on the moving amount and the observation angle in a case in which it is decided to execute the insertion control.

(4)

The display control device according to (3), in which the moving amount is a moving angle of a line of sight of an observer who observes the moving object, and the specific image insertion control unit decides the display time of the specific image in the period based on a ratio of the moving angle and the observation angle.

(5)

The display control device according to (4), in which assuming that the moving angle is L and the observation angle is H, the specific image insertion control unit sets time of 1−H/L times the period as the display time.

(6)

The display control device according to any one of (1) to (5), in which the insertion execution control unit further decides not to execute the insertion control in a case in which exposure time of one frame of the motion picture data is equal to or more than one frame time, which is based on a frame rate of the motion picture data.

(7)

The display control device according to any one of (1) to (6), in which the insertion execution control unit further decides not to execute the insertion control in a case in which a focusing evaluation value of the motion picture data is equal to or less than a predetermined threshold value.

(8)

The display control device according to any one of (1) to (7), in which the insertion execution control unit sets an actual moving amount of the moving object calculated from the motion picture data as the moving amount of the moving object.

(9)

The display control device according to any one of (1) to (7), in which the insertion execution control unit sets a pursuit limit moving amount of a person as the moving amount of the moving object.

(10)

The display control device according to (9), further comprising a measuring unit that measures the pursuit limit moving amount of an observer of the display unit, in which the insertion execution control unit sets any one of a plurality of the pursuit limit moving amounts as the moving amount of the moving object depending on a measurement result of the measuring unit.

(11)

The display control device according to any one of (1) to (10), further comprising a viewing angle calculating unit that calculates a viewing angle of the display unit by an observer of the display unit, in which the observation angle and the moving amount are calculated based on the viewing angle.

(12)

The display control device according to any one of (1) to (11), in which the observation angle and the moving amount are calculated based on a resolution of the motion picture data, a resolution of the display unit, and a viewing angle of the display unit by an observer of the display unit.

(13)

The display control device according to any one of (1) to (12), in which the specific image is a black image.

(14)

An imaging device comprising the display control device according to any one of (1) to (13), the display unit, and an imaging element, in which the motion picture data is a live view image of a subject, which is imaged by the imaging element.

(15)

A display control method of motion picture data, the method comprising a specific image insertion control step of performing an insertion control of displaying a specific image different from the motion picture data on a display unit in a period from displaying a first frame of the motion picture data on the display unit to displaying a second frame subsequent to the first frame of the motion picture data, and an insertion execution control step of deciding whether or not to execute the insertion control based on a moving amount of a moving object included in the motion picture data and an observation angle of one pixel of the motion picture data displayed on the display unit.

(16)

The display control method according to (15), in which the moving amount is a moving angle of a line of sight of an observer who observes the moving object, and in the insertion execution control step, it is decided not to execute the insertion control in a case in which the moving angle is equal to or less than the observation angle, and it is decided to execute the insertion control in a case in which the moving angle exceeds the observation angle.

(17)

The display control method according to (15) or (16), in which in the specific image insertion control step, display time of the specific image in the period is controlled based on the moving amount and the observation angle in a case in which it is decided to execute the insertion control.

(18)

The display control method according to (17), in which the moving amount is a moving angle of a line of sight of an observer who observes the moving object, and in the specific image insertion control step, the display time of the specific image in the period is decided based on a ratio of the moving angle and the observation angle.

(19)

The display control method according to (18), in which in the specific image insertion control step, assuming that the moving angle is L and the observation angle is H, time of 1−H/L times the period is set as the display time.

(20)

The display control method according to any one of (15) to (19), in which in the insertion execution control step, it is further decided not to execute the insertion control in a case in which exposure time of one frame of the motion picture data is equal to or more than one frame time, which is based on a frame rate of the motion picture data.

(21)

The display control method according to any one of (15) to (20), in which in the insertion execution control step, it is further decided not to execute the insertion control in a case in which a focusing evaluation value of the motion picture data is equal to or less than a predetermined threshold value.

(22)

The display control method according to any one of (15) to (21), in which in the insertion execution control step, an actual moving amount of the moving object calculated from the motion picture data is set as the moving amount of the moving object.

(23)

The display control method according to any one of (15) to (21), in which in the insertion execution control step, a pursuit limit moving amount of a person is set as the moving amount of the moving object.

(24)

The display control method according to (23), further comprising a measuring step of measuring the pursuit limit moving amount of an observer of the display unit, in which in the insertion execution control step, any one of a plurality of the pursuit limit moving amounts is set as the moving amount of the moving object depending on a measurement result of the measuring step.

(25)

The display control method according to any one of (15) to (24), further comprising a viewing angle calculating step of calculating a viewing angle of the display unit by an observer of the display unit, in which the observation angle and the moving amount are calculated based on the viewing angle.

(26)

The display control method according to any one of (15) to (25), in which the observation angle and the moving amount are calculated based on a resolution of the motion picture data, a resolution of the display unit, and a viewing angle of the display unit by an observer of the display unit.

(27)

The display control method according to any one of (15) to (26), in which the specific image is a black image.

(28)

A display control program that causes a computer to execute a display control method of motion picture data, in which the display control method includes a specific image insertion control step of performing an insertion control of displaying a specific image different from the motion picture data on a display unit in a period from displaying a first frame of the motion picture data on the display unit to displaying a second frame subsequent to the first frame of the motion picture data, and an insertion execution control step of deciding whether or not to execute the insertion control based on a moving amount of a moving object included in the motion picture data and an observation angle of one pixel of the motion picture data displayed on the display unit.

Although various embodiments have been described above with reference to the drawings, it is needless to say that the present invention is not limited to this. It is obvious that those skilled in the art can conceive various changes or modifications within the scope described in the claims, and naturally, such changes or modifications also belong to the technical scope of the present invention. Further, the components in the embodiments described above may be optionally combined without departing from the spirit of the invention.

The present application is based on a Japanese patent application filed on Feb. 20, 2019 (Japanese Patent Application No. 2019-028619), the contents of which are incorporated herein by reference.

The present invention can be preferably applied to electronic devices having an imaging function and a display function, such as a digital camera or a smartphone.

EXPLANATION OF REFERENCES

100: digital camera
1: imaging lens
2: stop
4: lens control unit
5: imaging element
8: lens drive unit
9: stop drive unit
10: imaging element drive unit
11: system control unit
14: operating unit
15: memory control unit
16: main memory
17: digital signal processing unit
20: external memory control unit
21: storage medium
23: display unit
24: control bus
25: data bus
40: lens device
11A: specific image insertion control unit
11B: insertion execution control unit
11C: viewing angle information acquiring unit
11D: measuring unit
23a, 23b: frame
23p: pixel
H: observation angle
M: moving object
L1, L2: moving amount
200: smartphone
201: housing
202: display panel
203: operation panel
204: display input unit
205: speaker
206: microphone
207: operating unit
208: camera unit
210: wireless communication unit
211: call unit 212: storage unit
213: external input and output unit
214: GPS receiving unit
215: motion sensor unit
216: power supply unit
217: internal storage unit
218: external storage unit
220: main control unit
ST1 to STn: GPS satellite

What is claimed is:

1. A display control device that performs a display control of motion picture data, the device comprising:
   a specific image insertion control unit that performs an insertion control of displaying a specific image different from the motion picture data on a display unit in a period between displaying a first frame of the motion picture data on the display unit and displaying a second frame subsequent to the first frame of the motion picture data; and
   an insertion execution control unit that decides whether or not to execute the insertion control based on a moving amount of a moving object included in the motion picture data and an observation angle of one pixel of the motion picture data displayed on the display unit,
   wherein the observation angle and the moving amount are calculated based on a resolution of the motion picture data, a resolution of the display unit and a viewing angle of the display unit by an observer of the display unit,
   the observation angle is an angle formed by two straight lines connecting both ends of each display pixel of the display unit in a horizontal direction or a vertical direction and eyes of the observer,
   the viewing angle is an angle formed by two straight lines connecting the eyes of the observer and both ends of a display surface of the display unit in the horizontal direction or the vertical direction, and
   the moving amount is a moving angle of a line of sight in the horizontal direction or the vertical direction in one frame of the observer who observes the moving object.

2. The display control device according to claim 1,
   wherein the insertion execution control unit decides not to execute the insertion control in a case in which the moving angle is equal to or less than the observation angle, and decides to execute the insertion control in a case in which the moving angle exceeds the observation angle.

3. The display control device according to claim 1,
   wherein the specific image insertion control unit controls display time of the specific image in the period based on the moving amount and the observation angle in a case in which the insertion execution control unit has decided to execute the insertion control.

4. The display control device according to claim 3,
   wherein the specific image insertion control unit decides the display time of the specific image in the period based on a ratio of the moving angle and the observation angle.

5. The display control device according to claim 4,
   wherein assuming that the moving angle is L and the observation angle is H, the specific image insertion control unit sets time of 1−H/L times the period as the display time.

6. The display control device according to claim 1,
   wherein the insertion execution control unit further decides not to execute the insertion control in a case in which exposure time of one frame of the motion picture data is equal to or more than one frame time, which is based on a frame rate of the motion picture data.

7. The display control device according to claim 1,
   wherein the insertion execution control unit further decides not to execute the insertion control in a case in which a focusing evaluation value of the motion picture data is equal to or less than a predetermined threshold value.

8. The display control device according to claim 1,
   wherein the insertion execution control unit sets an actual moving amount of the moving object calculated from the motion picture data as the moving amount of the moving object.

9. The display control device according to claim 1,
   wherein the insertion execution control unit sets a pursuit limit moving amount of a person as the moving amount of the moving object.

10. The display control device according to claim 9, further comprising a measuring unit that measures the pursuit limit moving amount of an observer of the display unit,
    wherein the insertion execution control unit sets any one of a plurality of the pursuit limit moving amounts as the moving amount of the moving object depending on a measurement result of the measuring unit.

11. The display control device according to claim 1, further comprising a viewing angle calculating unit that calculates a viewing angle of the display unit by an observer of the display unit,
    wherein the observation angle and the moving amount are calculated based on the viewing angle.

12. The display control device according to claim 1,
    wherein the specific image is a black image.

13. An imaging device comprising:
    the display control device according to claim 1;
    the display unit; and
    an imaging element,
    wherein the motion picture data is a live view image of a subject, which is imaged by the imaging element.

14. A display control method of motion picture data, the method comprising:
    a specific image insertion control step of performing an insertion control of displaying a specific image different from the motion picture data on a display unit in a period between displaying a first frame of the motion picture data on the display unit and displaying a second frame subsequent to the first frame of the motion picture data; and
    an insertion execution control step of deciding whether or not to execute the insertion control based on a moving amount of a moving object included in the motion picture data and an observation angle of one pixel of the motion picture data displayed on the display unit,
    wherein the observation angle and the moving amount are calculated based on a resolution of the motion picture data, a resolution of the display unit, and a viewing angle of the display unit by an observer of the display unit,
    the observation angle is an angle formed by two straight lines connecting both ends of each display pixel of the display unit in a horizontal direction or a vertical direction and eyes of the observer,
    the viewing angle is an angle formed by two straight lines connecting the eyes of the observer and both ends of a display surface of the display unit in the horizontal direction or the vertical direction, and the moving amount is a moving angle of a line of sight in the horizontal direction or the vertical direction in one frame of the observer who observes the moving object.

15. The display control method according to claim 14, wherein the insertion execution control step decides not to execute the insertion control in a case in which the moving angle is equal to or less than the observation angle, and decides to execute the insertion control in a case in which the moving angle exceeds the observation angle.

16. The display control method according to claim 14, wherein, in the specific image insertion control step, display time of the specific image in the period is controlled based on the moving amount and the observation angle in a case in which the insertion execution control step has decided to execute the insertion control.

17. The display control method according to claim 16, wherein in the specific image insertion control step, the display time of the specific image in the period is decided based on a ratio of the moving angle and the observation angle.

18. The display control method according to claim 17, wherein, in the specific image insertion control step, assuming that the moving angle is L and the observation angle is H, time of 1−H/L times the period is set as the display time.

19. The display control method according to claim 14, wherein the insertion execution control step further decides not to execute the insertion control in a case in which exposure time of one frame of the motion picture data is equal to or more than one frame time, which is based on a frame rate of the motion picture data.

20. The display control method according to claim 14, wherein the insertion execution control step further decides not to execute the insertion control in a case in which a focusing evaluation value of the motion picture data is equal to or less than a predetermined threshold value.

21. The display control method according to claim 14, wherein, in the insertion execution control step, an actual moving amount of the moving object calculated from the motion picture data is set as the moving amount of the moving object.

22. The display control method according to claim 14, wherein, in the insertion execution control step, a pursuit limit moving amount of a person is set as the moving amount of the moving object.

23. The display control method according to claim 22, further comprising a measuring step of measuring the pursuit limit moving amount of an observer of the display unit, wherein, in the insertion execution control step, any one of a plurality of the pursuit limit moving amounts is set as the moving amount of the moving object depending on a measurement result of the measuring step.

24. The display control method according to claim 14, further comprising a viewing angle calculating step of calculating a viewing angle of the display unit by an observer of the display unit, wherein the observation angle and the moving amount are calculated based on the viewing angle.

25. The display control method according to claim 14, wherein the specific image is a black image.

26. A non-transitory computer readable medium storing a display control program that causes a computer to execute processing including deciding whether or not to perform an insertion control of displaying a specific image different from motion picture data on a display unit in a period between displaying a first frame of the motion picture data on the display unit and displaying a second frame subsequent to the first frame of the motion picture data based on a moving amount of a moving object included in the motion picture data and an observation angle of one pixel of the motion picture data displayed on the display unit,
wherein the observation angle and the moving amount are calculated based on a resolution of the motion picture data, a resolution of the display unit, and a viewing angle of the display unit by an observer of the display unit,
the observation angle is an angle formed by two straight lines connecting both ends of each display pixel of the display unit in a horizontal direction or a vertical direction and eyes of the observer,
the viewing angle is an angle formed by two straight lines connecting the eyes of the observer and both ends of a display surface of the display unit in the horizontal direction or the vertical direction, and
the moving amount is a moving angle of a line of sight in the horizontal direction or the vertical direction in one frame of the observer who observes the moving object.

* * * * *